US010405557B2

(12) United States Patent
van Blokland

(10) Patent No.: US 10,405,557 B2
(45) Date of Patent: Sep. 10, 2019

(54) DEVICE FOR WEIGHING DOUGH AND METHOD FOR OPERATING SUCH DEVICE

(71) Applicant: Radie B.V., Culemborg (NL)

(72) Inventor: Johannes Josephus Antonius van Blokland, Beusichem (NL)

(73) Assignee: RADIE B.V. (NL)

( * ) Notice: Subject to any disclaimer, the term of this patent is extended or adjusted under 35 U.S.C. 154(b) by 0 days.

(21) Appl. No.: 14/476,423

(22) Filed: Sep. 3, 2014

(65) Prior Publication Data

US 2015/0064315 A1 Mar. 5, 2015

(30) Foreign Application Priority Data

Sep. 5, 2013 (EP) .................................... 13183249

(51) Int. Cl.

*B26D 7/30* (2006.01)
*A21C 5/00* (2006.01)
*G01G 11/04* (2006.01)

(52) U.S. Cl.

CPC ................ *A21C 5/00* (2013.01); *G01G 11/04* (2013.01); *B26D 7/30* (2013.01)

(58) Field of Classification Search

CPC .. B26D 7/30; G01G 11/14–20; G01G 19/035; G01G 19/04; G01G 19/043; A21C 5/00
USPC .............................................................. 83/77
See application file for complete search history.

(56) References Cited

U.S. PATENT DOCUMENTS

| | | | | |
|---|---|---|---|---|
| 4,437,561 | A * | 3/1984 | Hasegawa | G01G 11/003 177/145 |
| 4,526,244 | A * | 7/1985 | Chauveau | G01G 11/003 177/1 |
| 4,580,475 | A | 4/1986 | Antonissen | |
| 5,188,210 | A | 2/1993 | Malow | |
| 6,164,174 | A * | 12/2000 | Sigurdsson | 83/13 |
| 6,433,288 | B1 * | 8/2002 | Olafsson | G01G 11/046 177/145 |
| 6,524,090 | B1 | 2/2003 | Hayashi et al. | |
| 8,969,743 | B2 * | 3/2015 | Huebler | G01G 19/005 177/145 |
| 9,146,146 | B2 * | 9/2015 | Laird | G01G 19/00 |
| 2008/0035390 | A1 * | 2/2008 | Wurz | G01B 11/04 177/25.15 |

(Continued)

FOREIGN PATENT DOCUMENTS

| | | | |
|---|---|---|---|
| EP | 0145351 | A2 | 6/1985 |
| EP | 2116821 | A1 | 11/2009 |
| GB | 2391323 | A | 2/2004 |

*Primary Examiner* — Kenneth E Peterson
(74) *Attorney, Agent, or Firm* — Katten Muchin Rosenman LLP

(57) ABSTRACT

The present invention relates to a device for weighing dough, comprising an endless conveyor, for conveying a plurality of endless or continuous dough pieces extending essentially in parallel lanes on said conveyor in a direction of conveyance, a weighing-unit, arranged under the endless conveyor, characterised in that the weighing unit comprises multiple weighing rows, spread over the width of the conveyor, each row comprising at least one rectangular weighing section, for independently of the other weighing sections weighing a different dough piece of said plurality of endless or continuous dough pieces. The invention further relates to a method for operating such device.

15 Claims, 4 Drawing Sheets

(56) References Cited

U.S. PATENT DOCUMENTS

2014/0034448 A1* 2/2014 van Blokland .......... A21C 5/00
198/341.04

* cited by examiner

DEVICE FOR WEIGHING DOUGH AND METHOD FOR OPERATING SUCH DEVICE

CROSS-REFERENCE TO RELATED APPLICATION

This application claims priority to European Patent Application No. 13183249.5 filed Sep. 5, 2013, the disclosure of which is hereby incorporated in its entirety by reference.

BACKGROUND OF THE INVENTION

Field of the Invention

The present invention relates to an apparatus for weighing dough. More in particular, the invention relates to a device for conveying a plurality of endless dough pieces, extending essentially in parallel lanes on said conveyor in a direction of conveyance.

Description of Related Art

Such devices are known in the art, for example from the European Patent EP 2 116 821 in the name of the same applicant. The device disclosed therein has proved to be an improvement over the prior art, but a demand for further development has appeared.

In particular, when applied in circumstances wherein a plurality of continuous dough pieces is processed that appear not to have equal average weight distributions, it is considered disadvantageous that an average of multiple dough pieces is weighed, in order to determine a common cutting length for all pieces, based on a desired weight per piece.

One solution may be to split up the single conveyor into a plurality of small conveyors, one for each (endless) dough piece, but this has several disadvantages. The construction is complex, and since there is a space in between the separate conveyors, there is a higher risk of filthiness such as dough and flour residue occurring in between the conveyors, which leads to more maintenance and possible negative influence on the weighing performance.

Under some circumstances the use of one or more weighing rollers may be desired, positioned under the endless conveyor, for measuring the dough conveyed by the conveyor. However, such solution has the disadvantage that a weight-curve of a dough piece measured has a triangular deformation, and it has appeared to be very sensitive to imperfections in the conveyor belt.

It is a goal of the present invention, to provide a solution that does not have the above disadvantages, or at least to provide a useful alternative to the state of the art.

SUMMARY OF THE INVENTION

The invention thereto proposes a device for weighing dough, comprising an endless conveyor for conveying a plurality of endless or continuous dough pieces extending essentially in parallel lanes on said conveyor in a direction of conveyance, a weighing-unit, arranged under the endless conveyor, wherein the weighing unit comprises multiple weighing rows, spread over the width of the conveyor, each row comprising at least one rectangular weighing section, for independently of the other weighing sections weighing a different dough piece of said plurality of endless or continuous dough pieces.

With respect to the state of the art, the present invention takes away the disadvantage that a weight measurement has a trapezium- or V-shaped curve. Preferably, according to the present invention, the length of a rectangular weighing section is chosen such that it matches the length of a dough piece to be measured. A measurement is then performed to determine the weight of the piece of dough on the weighing device. The measured weight is compared to an expected and/or desired weight of the dough piece. If the weight is higher than the expected or desired weight of the measured length, a cutting operation may be performed earlier, that is, a shorter piece may be cut off the endless dough piece in order to obtain a desired weight, or the other way round, if the weight is lower than the expected or desired weight of the measured length, a cutting operation may be performed later, that is, a longer piece may be cut off the endless dough piece in order to obtain a desired length.

According to the present invention, a method for measuring the weight of a dough piece with U, D (unit, decimal) times the length of a weighing section of a device as described above, wherein each row comprises one rectangular weighing section, comprises the steps of:

A. Transporting at least one endless dough piece on a lane of the conveyor;
B. Measuring the weight of the dough on the weighing section;
C. Displacing the dough one length of the weighing section;
D. Repeating steps B and C U−1 times;
E. Measuring the weight on the weighing section again after a displacement of the dough of 0,D length of the weighing section and multiplying the measurement value by 0,D;
F. Adding up the weights thus obtained.

However, it is not always possible to have the rectangular weighing section corresponding with the length of a dough piece to be cut off from the endless or continuous dough piece. Possibly because the length of the dough piece to be cut is too long, possibly because it changes during use. Furthermore, in some cases an alternative to the above method may be desired.

Therefor, in a further embodiment, at least one row comprises a plurality of weighing sections, arranged behind each other in the direction of conveyance. At least one of the weighing sections may have a different length than the other ones, or in particular, each of the weighing sections has a different length.

In particular, the weighing sections are arranged adjacently behind each other.

Such configuration may them be used in a method for measuring the weight of a dough piece, comprising the steps of:

A. Transporting at least one endless dough piece on a lane of the conveyor;
B. Virtually splitting up the length of a dough piece to be weighed into sub-pieces with lengths that correspond to weighing sections or combinations or differences thereof;
G Measuring the weight of the sub-pieces when they pass the corresponding weighing section;
F. Adding up the weights thus obtained.

When differences are used, it may even be necessary to subtract the weight measured by a weighing section.

For receiving weight information from the weighing sections and displacement information of the conveyor, and determining the weight per unit of length of the dough on each lane, the device may comprise a processor, which may further be configured to generate a control signal for a further processing device of each lane, like a cutter, for controlling the further processing device based on the determined weight, such as the cumulative weight per lane.

In yet another embodiment, the weighing unit comprises a weighing area, wherein weighing rows and weighing sections are configurable. With this solution, every desired shape of dough piece to be weighed can be weighed, with one and the same device, and a change in a desired shape just requires reconfiguration of the device. The weighing area may thereto for instance comprise a weighing matrix, with weighing cells, from which weighing sections can be defined. These cells may have a size equal or less than 3×3 cm, preferably equal or less than 2×2 cm, and even more preferably equal or less than 1×1 cm.

It is possible that an expected length of a dough piece on a lane is not an exact multiple of weighing cells of sections. In such case, a somewhat shorter or longer piece of dough can be measured, wherein the weight is determined by extrapolation or interpolation respectively. Preferably the measurement is performed on actual dough that is to form part of the piece to be cut, that is, a part of the dough piece is weighed twice, for which a correction is applied later on.

A method according to the invention for measuring a weight of a dough piece with the above described device comprises the steps of:

A. Transporting at least one endless dough piece on a lane of the conveyor;
B. Configuring an array of weighing sections that corresponds to the format of a dough piece to be weighed;
C. Measuring the weight on the weighing sections of the array;
F. Adding up the weights thus obtained.

Since a general purpose of the device according to the present invention is to weigh an amount of dough that needs to be cut from the endless dough sheet, it may further comprise either one knife that can be displaced over the width of the conveyor, or a plurality of cutting units downstream the weighing units, for separately and independently cutting each of the parallel dough pieces, based on the determined weights by the weighing sections.

Thereto, the invention also relates to a method for controlling a cutting device for an endless dough piece, comprising:

H. Obtaining a weight setpoint for a dough piece to be cut;
I. Determining an expected length of the endless dough piece, expected to have the setpoint weight, based on an expected weight per unit of length;
J. Determining the weight of a dough piece with the expected length as described above;
K. Calculating multiplication factor that indicates how many times an expected weight the determined weight is;
L. Dividing an expected length of the dough piece to be cut by the multiplication factor;
M. Cutting the dough piece at the divided length.

After cutting a dough piece has been cut, the cutting line forms a new initiation point for a next dough piece, and weight measurement takes place from the new initiation point.

BRIEF DESCRIPTION OF THE DRAWINGS

The invention will now be elucidated into more detail with reference to the following figures. Herein.

DETAILED DESCRIPTION OF THE INVENTION

Figure 1:
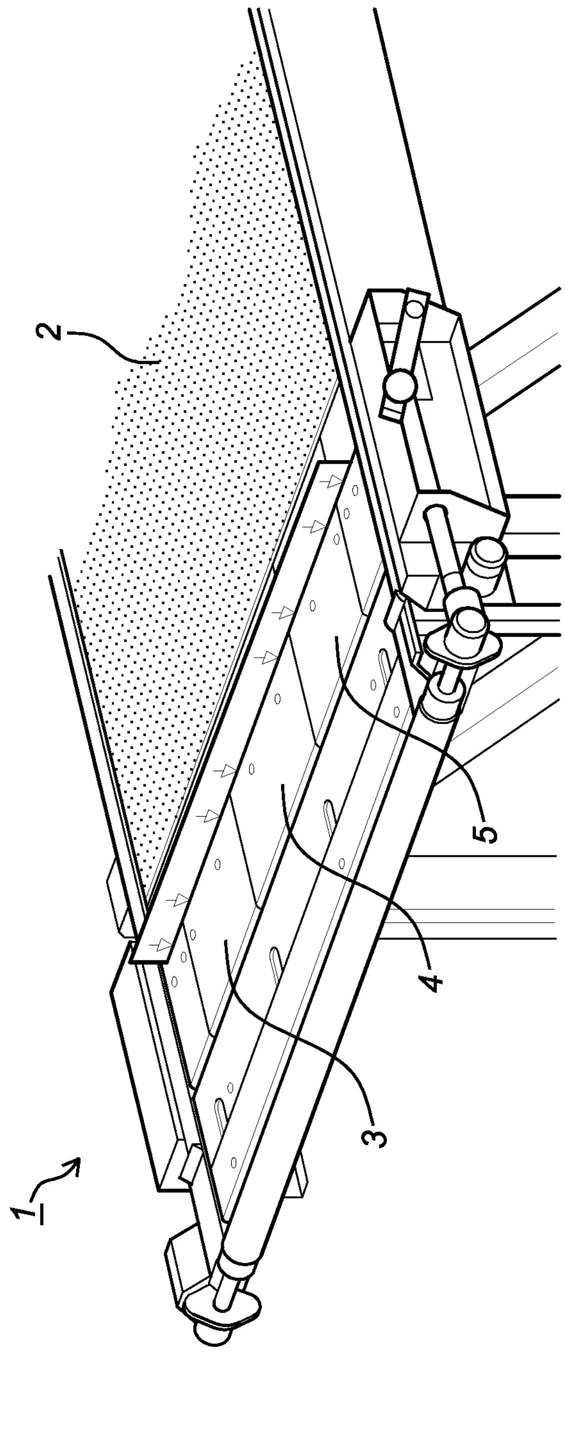
FIG. 1 shows a device according to a first embodiment of the present invention.

FIG. 1 shows a device 1 for weighing dough, comprising an endless conveyor 2 (partly shown) for conveying a plurality of endless or continuous dough pieces extending essentially in parallel lanes on said conveyor in a direction of conveyance; a weighing-unit, arranged under the endless conveyor, comprising multiple weighing rows spread over the width of the conveyor, wherein each row comprises at least one rectangular weighing section 3, 4, 5 (normally covered with the endless conveyor), for independently of the other weighing sections weighing a different dough piece of said plurality of endless or continuous dough pieces.

Figure 2:
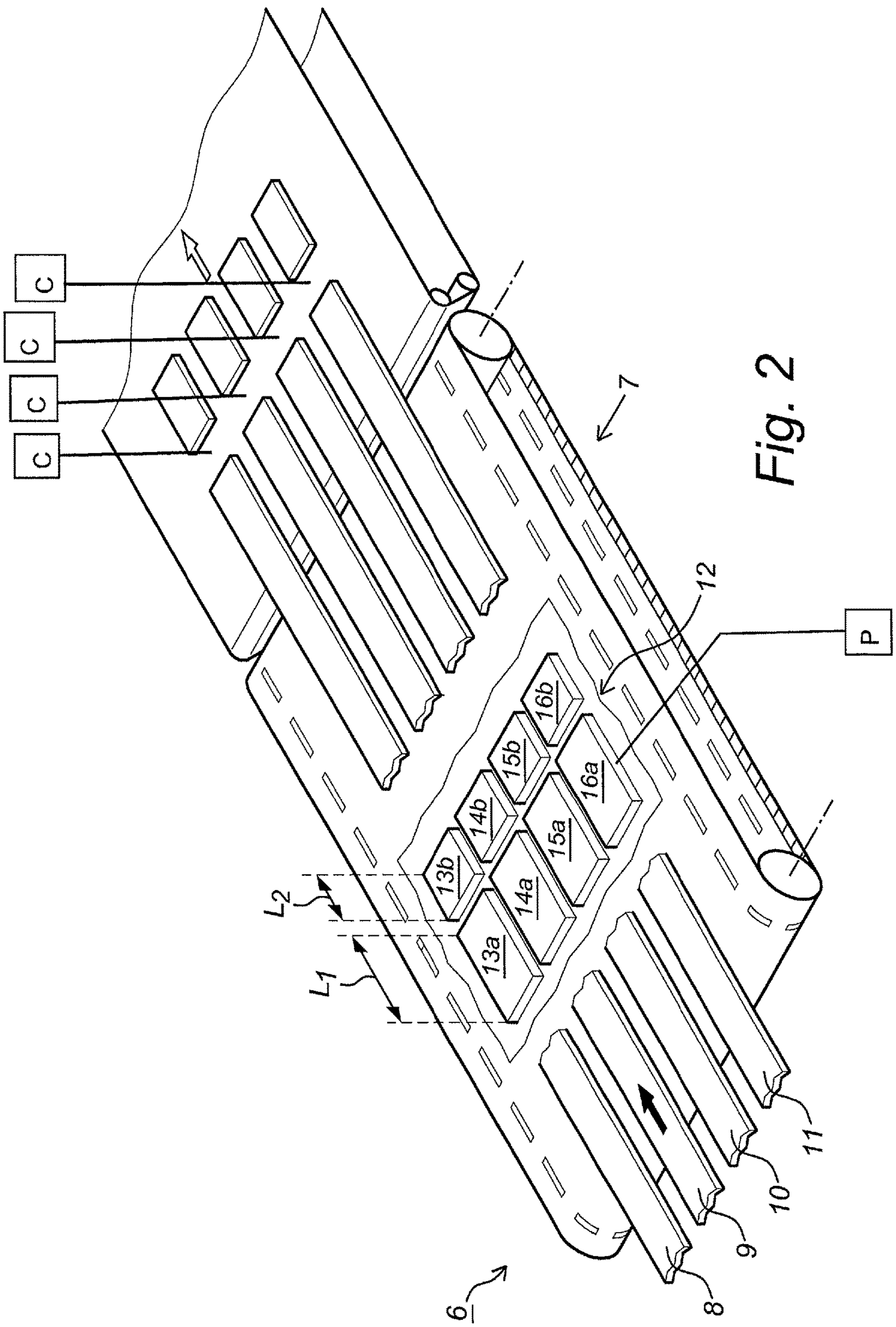
FIG. 2 shows a device according to a second embodiment of the present invention.

FIG. 2 shows a device 6 for weighing dough, comprising an endless conveyor 7 for conveying a plurality of endless or continuous dough pieces 8, 9, 10, 11 extending essentially in parallel lanes on said conveyor in a direction of conveyance.

For ruling out, or at least avoiding influence of the tension of the conveyor on the measurement, the conveyor is arranged slackly in a width direction. Thereto, it may be provided with one or more transition parts, arranged slightly inward of the outer edges of the conveyor in the width direction, and wherein the transition parts are arranged to provide the middle part in between the transition part with a substantially flexible suspension in a direction perpendicular to a plane defined by the width direction and the direction of conveyance.

In the embodiment shown, the outer edges of the conveyor comprise a toothed belt, and wherein the device comprises gear drive for driving the conveyor. A drive configuration with a toothed belt is free of slip, and allows to determine and to keep track of the exact position of the belt. The conveyor may preferably be driven at both sides, and may further comprise a line, extending over the with of the conveyor perpendicular to the direction of conveyance, for verifying a correct placement of the conveyor with respect to the gear drive. Other belts may be used as well in combination with the features of the present embodiment.

The device further comprises a weighing-unit 12, arranged under the endless conveyor, comprising multiple weighing rows 13, 14, 15, 16, spread over the width of the conveyor, each row comprising two rectangular weighing sections (normally covered by the conveyor) 13*a*, 13*b*, 14*a*, 14*b*, 15*a*, 15*b*, 16*a*, 16*b*, for independently of the other weighing sections weighing a different dough piece of said plurality of endless or continuous dough pieces.

FIG. 2 also shows that the device 6 further includes a processor P for receiving weight information from the weighing sections 13*a*, 13*b*, 14*a*, 14*b*, 15*a*, 15*b*, 16*a*, 16*b* and displacement information from the conveyor 7. The processor P determines the weight per unit length of the dough pieces 8, 9, 10, 11 on each lane of the conveyor 7 based on the weight information and the displacement information. The device may also include one or more further processing devices, such as cutting units C positioned downstream of the weighing sections 13*a*, 13*b*, 14*a*, 14*b*, 15*a*, 15*b*, 16*a*, 16*b*. Each cutting unit C is associated with one of the lanes of the conveyor 7 and is configured to cut one of the parallel dough pieces 8, 9, 10, 11. The processor P may further be configured to generate a control signal for controlling each cutting unit C based on the determined weight, such as the cumulative weight per lane.

Figure 3:
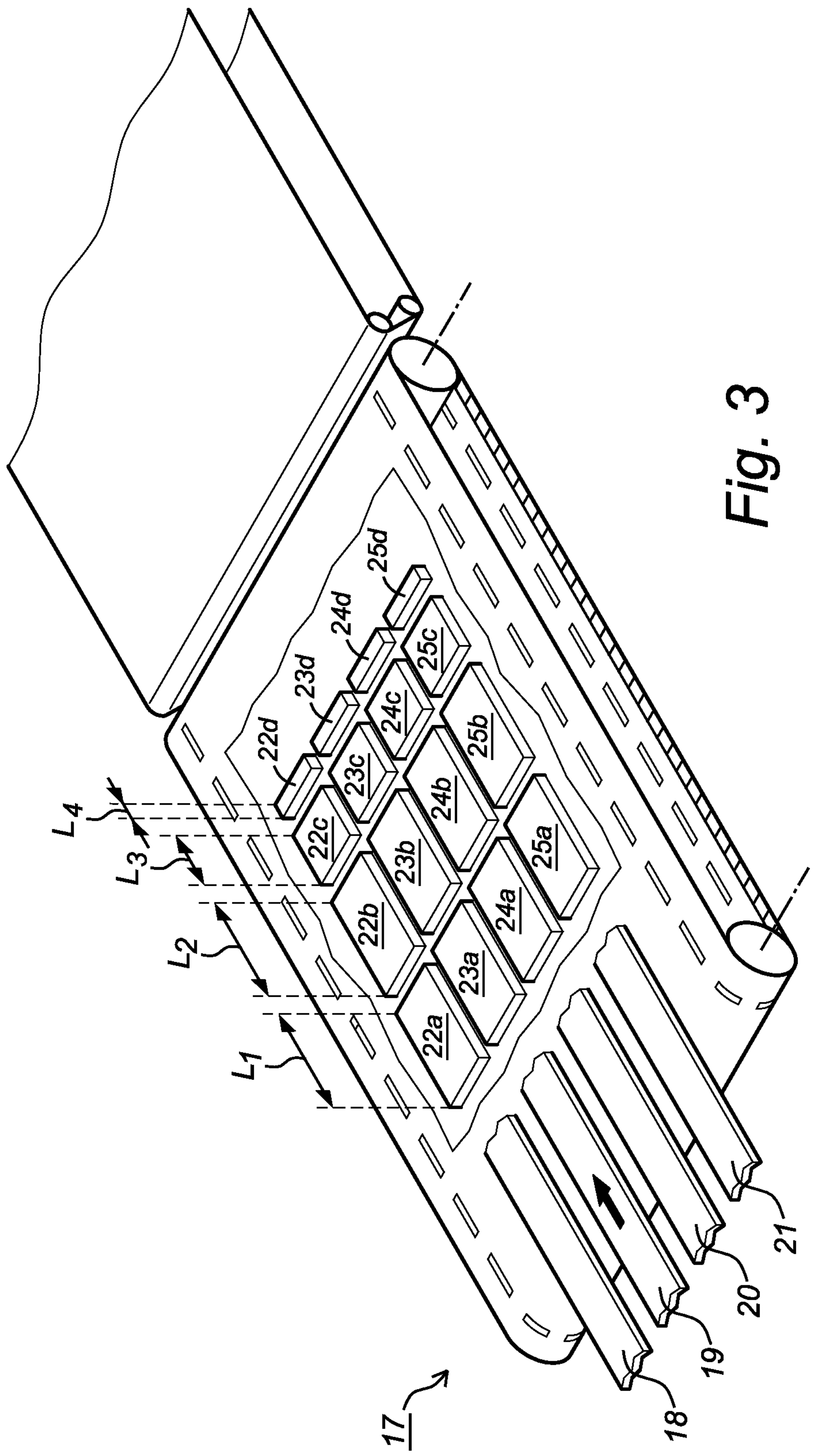
FIG. 3 shows a device according to a third embodiment of the present invention.

FIG. 3 shows a device 17 for weighing dough, comprising an endless conveyor 18 for conveying a plurality of endless or continuous dough pieces 18, 19, 20, 21 extending essentially in parallel lanes on said conveyor in a direction of conveyance, a weighing-unit, arranged under the endless conveyor, comprising multiple weighing rows, spread over the width of the conveyor, each row comprising four rectangular weighing sections 22*a-d*, 23*a-d*, 24*a-d*, 25*a-d*, for independently of the other weighing sections weighing a different dough piece of said plurality of endless or continuous dough pieces 18, 19, 20, 21.

In the embodiments from FIGS. 1, 2 and 3, a weighing section may typically be formed by a table, having a length between 5 and 80 cm. For instance, in FIG. 3 weighing sections 22-25*a* have lengths of 300 mm, weighing sections 22-25*b* have lengths of 200 mm, weighing sections 22-25*c* have lengths of 100 mm and weighing sections 22-25*d* have lengths of 50 mm. A length here is to be seen in the direction of conveyance. The width of all sections may be equal, and chosen such that the required width of the conveyor can be used.

The device according to the invention may even have an exchangeable weighing section, that allows to quickly replace the weighing tables. In such case, the configurations from FIGS. 1, 2 and 3 can be realized in one and the same device.

Figure 4:
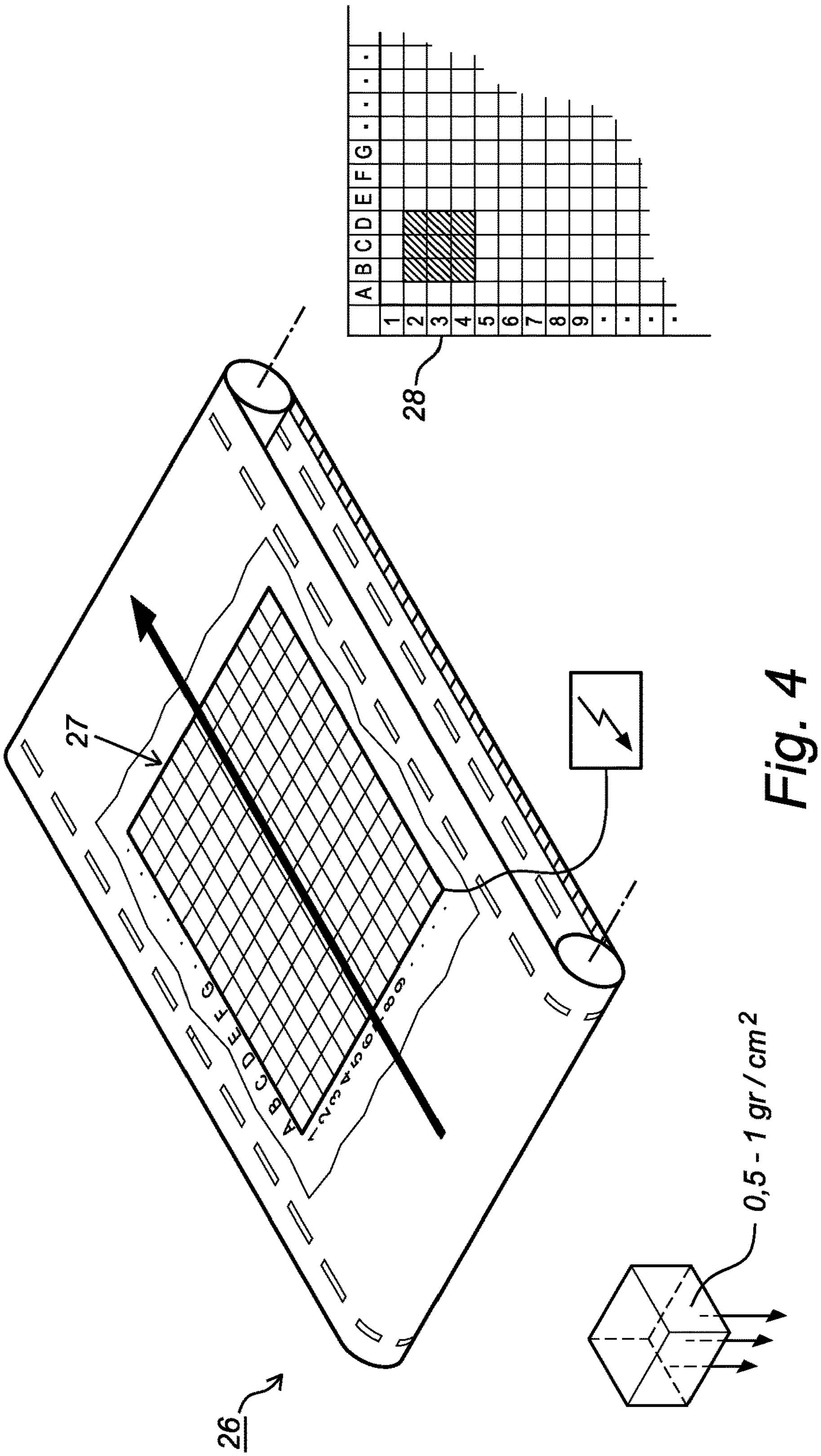
FIG. 4 shows a device according to a fourth embodiment of the present invention.

FIG. 4 shows a further embodiment of a device 26 according to the present invention, wherein the weighing device comprises a weighing area 27, wherein weighing rows and weighing sections, are configurable. As shown in the figure, the weighing area comprises a weighing matrix, with weighing cells a1, etc, from which weighing sections can be defined, or freely configured, as is shown in scheme 28. These cells for instance have a size equal or less than 3×3 cm, preferably equal or less than 2×2 cm, and even more preferably equal or less than 1×1 cm. A dough cube of 1×1 cm as depicted in FIG. 4 has a weight of 0,5 to 1 gram.

The matrix may be formed by a touch-screen like device over which the endless conveyor moves, or a configurable array of sensitive piezo elements, or a foil with a printed circuit that contacts locally when a pressure is applied, or other solutions known in the art.

Not only can a weight be determined very precisely with this embodiment, but it is also possible to determine shapes of dough pieces conveyed over the conveyor.

The invention claimed is:

1. A device for weighing and cutting dough, comprising:

an endless conveyor, for conveying a plurality of elongated dough pieces extending essentially in parallel lanes on said conveyor in a direction of conveyance;

a weighing-unit, arranged under the endless conveyor, wherein the weighing-unit comprises multiple weighing rows, substantially spread over the width of the conveyor, wherein the weighing unit does not extend to the full width of the conveyor whereby a space is defined between outer weighing rows and outer edges of the conveyor;

a processor in communication with the endless conveyor and the weighing-unit for receiving weight information from the weighing-unit and displacement information from the conveyor, wherein:

each of the multiple weighing rows comprises at least one rectangular weighing section, each of the weighing rows and the at least one rectangular weighing section therein being configured to weigh an elongated dough piece arranged in the lane over the respective weighing row independently of any other one of the multiple weighing rows and any other rectangular weighing section any other one of the multiple weighing rows, at least one row of the multiple weighing rows comprises a plurality of horizontal rectangular weighing sections covered by the endless conveyor, the plurality of horizontal rectangular weighing sections being arranged adjacently behind each other in the direction of conveyance, each of the multiple weighing rows is configured to weigh elongated dough pieces that a length greater than a total length of the horizontal rectangular weighing section or sections in the respective weighing row, and the processor is configured to determine a weight per unit length of the elongated dough piece based on the received weighing information from the weighing-unit and the displacement information from the conveyor; and at least one cutting unit, responsive to the weight per unit length from the processor, downstream from the weighing unit, each of the at least one cutting unit for cutting one of the parallel dough pieces.

2. The device according to claim 1, wherein the processor is further configured to generate a control signal for a further processing device of each lane for controlling the further processing device based on the determined weight.

3. The device according to claim 1, wherein the at least one cutting unit comprises a plurality of cutting units.

4. The device according to claim 1, wherein each of the horizontal rectangular weighing sections in the at least one row comprising a plurality of horizontal rectangular weighing sections have different lengths.

5. The device according to claim 1, wherein a weighing section is formed by a table, having a length between 5 and 80cm.

6. The device according to claim 1, wherein the weighing unit comprises a weighing area, wherein weighing rows and weighing sections, are configurable.

7. The device according to claim 6, wherein the weighing area comprises a weighing matrix, with weighing cells, from which weighing sections can be defined.

8. The device according to claim 7, wherein the cells have a size equal or less than 2×2 cm.

9. The device according to claim 7, wherein the cells have a size equal or less than 1×1 cm.

10. The device according to claim 7, wherein the cells have a size equal or less than 3×3 cm.

11. The device according to claim 1, wherein each of the rectangular weighing sections of the at least one row comprising a plurality of horizontal rectangular weighing sections is configured to independently weigh a sub-piece of the elongated dough piece arranged in the lane.

12. The device of claim 11, wherein the processor is configured to determine a weight per unit length of the elongated dough piece based on the based on the weights of the sub-pieces of the elongated dough piece measured by the plurality of horizontal rectangular weighing sections and the displacement information from the conveyor.

13. The device according to claim 1, wherein each of the multiple weighing rows begins and ends at the same point as the other weighing rows.

14. The device according to claim 1, wherein the rectangular weighing sections of the weighing rows are aligned with each other in a grid-like array.

15. The device according to claim 1, wherein each of the multiple weighing rows comprises a plurality of horizontal rectangular weighing sections that are arranged so that each of multiple rows has horizontal rectangular weighing sections that are substantially identical to and aligned with the horizontal rectangular weighing sections in the adjacent weighing row.

* * * * *